United States Patent
Patel

(10) Patent No.: US 10,417,832 B2
(45) Date of Patent: Sep. 17, 2019

(54) DISPLAY DEVICE SUPPORTING CONFIGURABLE RESOLUTION REGIONS

(71) Applicant: Facebook Technologies, LLC, Menlo Park, CA (US)

(72) Inventor: Nirav Rajendra Patel, San Francisco, CA (US)

(73) Assignee: Facebook Technologies, LLC, Menlo Park, CA (US)

(*) Notice: Subject to any disclaimer, the term of this patent is extended or adjusted under 35 U.S.C. 154(b) by 161 days.

(21) Appl. No.: 15/068,326

(22) Filed: Mar. 11, 2016

(65) Prior Publication Data

US 2016/0267715 A1 Sep. 15, 2016

Related U.S. Application Data

(60) Provisional application No. 62/131,705, filed on Mar. 11, 2015.

(51) Int. Cl.
| | |
|---|---|
| *G06T 19/20* | (2011.01) |
| *G09G 3/3258* | (2016.01) |
| *G06F 3/01* | (2006.01) |
| *G09G 5/373* | (2006.01) |
| *G09G 5/395* | (2006.01) |
| *G06F 3/0484* | (2013.01) |

(52) U.S. Cl.
CPC .............. *G06T 19/20* (2013.01); *G06F 3/013* (2013.01); *G06F 3/0484* (2013.01); *G09G 3/3258* (2013.01); *G09G 5/373* (2013.01); *G09G 5/395* (2013.01); *G06T 2219/2016* (2013.01); *G09G 2310/0224* (2013.01); *G09G 2310/0291* (2013.01); *G09G 2310/04* (2013.01); *G09G 2340/0407* (2013.01); *G09G 2354/00* (2013.01)

(58) Field of Classification Search
CPC ................................ G06T 19/20; G06F 3/013
USPC ........................................................ 345/633
See application file for complete search history.

(56) References Cited

U.S. PATENT DOCUMENTS

| | | | |
|---|---|---|---|
| 8,004,540 B1 | 8/2011 | Munter et al. | |
| 8,624,812 B2 | 1/2014 | Lee et al. | |
| 9,773,454 B2 | 9/2017 | Kim | |
| 2002/0167461 A1* | 11/2002 | Bronson | G06F 3/1438 345/3.3 |
| 2006/0038765 A1 | 2/2006 | Lee et al. | |
| 2008/0278682 A1 | 11/2008 | Huxlin et al. | |

(Continued)

OTHER PUBLICATIONS

Reingold, E., Loschky, L., McConkie, G. and Stampe, D. (2003). Gaze-Contingent Multiresolutional Displays: An Integrative Review. Human Factors: The Journal of the Human Factors and Ergonomics Society, 45(2), pp. 307-328. (Year: 2003).*

(Continued)

*Primary Examiner* — Shivang I Patel
(74) *Attorney, Agent, or Firm* — Fenwick & West LLP

(57) ABSTRACT

A virtual reality system and a display device that can be used, for example, as part of the virtual reality system. The display device can have more than one data driver, such as an even row data driver and an odd row data driver. The display device can have a configurable resolution such that one region of the display device operates at full resolution while another region of the display device operates at a reduced resolution. The virtual reality system can also track an eye gaze and adjust the full resolution region of the display device to track the eye gaze.

22 Claims, 17 Drawing Sheets

(56) References Cited

U.S. PATENT DOCUMENTS

| | | |
|---|---|---|
| 2010/0253708 A1 | 10/2010 | Kasai |
| 2013/0113778 A1 | 5/2013 | Yoshimoto |
| 2014/0077725 A1 | 3/2014 | Lee et al. |
| 2014/0176527 A1 | 6/2014 | Liu et al. |
| 2015/0145843 A1 | 5/2015 | Park et al. |
| 2015/0348232 A1* | 12/2015 | Biggs .................... G06T 3/4007 345/660 |
| 2016/0063961 A1 | 3/2016 | Pyo et al. |
| 2016/0155405 A1 | 6/2016 | Kim et al. |
| 2016/0180789 A1 | 6/2016 | Hur et al. |
| 2016/0240013 A1* | 8/2016 | Spitzer .................... G06F 3/013 |

OTHER PUBLICATIONS

Reingold, E.M. et al., "Gaze-Contingent Multiresolutional Displays: An Integrative Review," Human Factors, Summer 2003, pp. 307-327.

\* cited by examiner

DISPLAY DEVICE SUPPORTING CONFIGURABLE RESOLUTION REGIONS

CROSS REFERENCE TO RELATED APPLICATIONS

The present application claims priority from U.S. Provisional Patent Application No. 62/131,705, filed on Mar. 11, 2015, the contents of which are incorporated by reference herein in their entirety.

BACKGROUND

The present disclosure generally relates to virtual reality systems and display operation in a virtual reality system.

Electronic displays include a plurality of pixels, which may each include a plurality of sub-pixels (e.g., a red sub-pixel, a green sub-pixel, etc.). Most displays are designed for use with cellphones, tablets and televisions. However, the characteristics of most displays are not ideal for use in a virtual reality (VR) headset where performance requirements (e.g. resolution and refresh rate) are more stringent than in typical displays.

SUMMARY

In one embodiment, a display device comprises a display screen. The display screen includes a first pixel row of first pixels having respective storage capacitors, the first pixels connected to a first scan line, a second pixel row of second pixels having respective storage capacitors, the second pixels connected to a second scan line, first data lines connected to the first pixel row, and second data lines connected to the second pixel row. Additionally, a first data driver circuit drives the first pixel row via the first data lines. A second data driver circuit drives the second pixel row via the second data lines.

In one embodiment, a display device comprises a display screen having a plurality of pixels organized into pixel columns and pixel rows. A resolution circuit stores resolution configuration data indicative of a location of a first region of the display screen operating in reduced resolution and indicative of a location of a second region of the display screen operating in full resolution. A selective scaling circuit receives image data and processes the image data based on the resolution configuration data, the selective scaling circuit upscaling a first portion of the image data for the first region of the display screen and not upscaling a second portion of the image data for the second region of the display screen.

In one embodiment, a virtual reality system, comprises a virtual reality headset. The headset comprises a display having a first region operating in reduced resolution and a second region operating in full resolution. The headset also comprises an eye tracking sensor to generate gaze data indicative of a gaze direction of the eye. The virtual reality system adjusts a location of the second region operating in full resolution based on the gaze direction of the eye.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
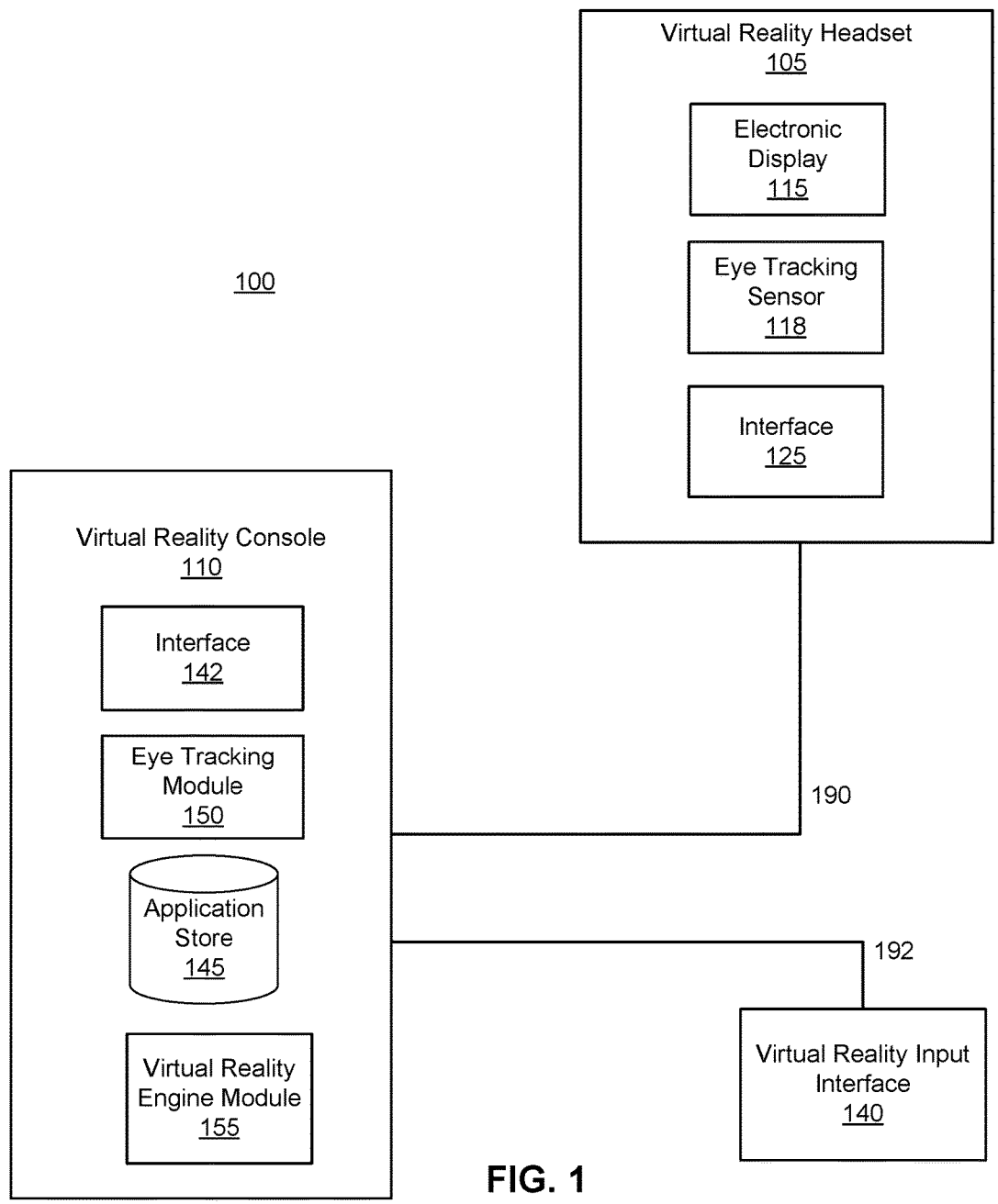
FIG. 1 is a block diagram of a virtual reality system environment, according to an embodiment.

FIG. 1 is a block diagram of a virtual reality (VR) system environment 100, according to an embodiment. The system environment 100 shown by FIG. 1 comprises a VR headset 105 and a VR input interface 140 that are each coupled to the VR console 110 through wired connections 190 and 192. For example, the wired connection 190 can be a video cable coupling the VR headset 105 to the VR console 110. In other embodiments the devices may communicate wirelessly instead of through wired connections.

While FIG. 1 shows an example system 100 including one VR headset 105 and one VR input interface 140, in other embodiments any number of these components may be included in the system 100. For example, there may be multiple VR headsets 105 each having an associated VR input interface 140, with each VR headset 105 and VR input interface 140 communicating with the VR console 110. In alternative configurations, different and/or additional components may be included in the system environment 100.

The VR headset 105 is a head-mounted device that presents media to a user and is an example of a display device. Examples of media presented by the VR head set include one or more images, video, audio, or some combination thereof. In some embodiments, audio is presented via an external device (e.g., speakers and/or headphones) that receives audio information from the VR headset 105, the VR console 110, or both, and presents audio data based on the audio information. An embodiment of the VR headset 105 is further described below in conjunction with FIGS. 2A and 2B. The VR headset 105 may comprise one or more rigid bodies, which may be rigidly or non-rigidly coupled to each other together. A rigid coupling between rigid bodies causes the coupled rigid bodies to act as a single rigid entity. In contrast, a non-rigid coupling between rigid bodies allows the rigid bodies to move relative to each other.

The VR headset 105 includes an electronic display 115, eye tracking sensor 118, and communication interface 125. The VR headset 105 may include other components not shown in FIG. 100, such as position sensors and location sensors (not shown). The interface 125 sends data to and receives data from the virtual reality console via the wired connection 190.

The electronic display 115 displays images to the user in accordance with image data received from the VR console 110. In various embodiments, the electronic display 115 may comprise a single electronic display or multiple electronic displays (e.g., a display for each eye of a user). Examples of the electronic display 115 include: an organic light emitting diode (OLED) display, a liquid crystal display (LCD), or other types of displays.

The electronic display 115 includes a display screen having a matrix of pixels organized into pixel columns and pixel rows. The electronic display 115 also includes display circuitry that receives image data from the virtual reality console 110 and generates pixel driving signals in order to produce visual images on the display screen from the image data.

In one embodiment, the electronic display 115 includes twice the number of data lines and data drivers of a typical display. The increased data lines and connection of the data lines to the pixels allows the refresh rate of the electronic display 115 to be doubled in frequency. The higher refresh rates increase the realism of moving images shown on the electronic display 115. Similarly, the refresh rate can be maintained while increasing the time allowed per row to charge the pixel capacitors.

In one embodiment, the electronic display 115 can be selectively configured to have a higher effective resolution in a section of the screen that matches the direction of the user's gaze, while having a lower effective resolution in other sections of the screen not being viewed by a user. This reduces the required bandwidth needed to provide image data from the virtual reality console 110 to the virtual reality headset 105 via the wired connection 190 without any perceptible loss in image quality.

Eye tracking sensor 118 tracks the gaze of a user's eye and generates gaze data indicative of gaze direction of the user's eye. One example of an eye tracking sensor 118 is a camera that captures infrared light reflected off the pupil of the eye with an image sensor, and which generates gaze data in the form of captured images. The gaze data is then transmitted to the virtual reality console 110, where the images are processed by the eye tracking module 150 to extract gaze direction from changes in reflections. The gaze direction is then used to selectively adjust the region of the display 115 that is to have higher resolution. The higher resolution region is continuously moved to track the user's gaze direction. In another embodiment, the eye tracking module 150 may be located within the virtual reality headset 105 such that the gaze direction is determined within the headset 105 itself. Other examples of eye tracking sensors 118 are also possible, such as eye-attached tracking sensors and electric potential measurement sensors.

The VR input interface 140 is a device that allows a user to send action requests to the VR console 110. An action request is a request to perform a particular action. For example, an action request may be to start or end an application or to perform a particular action within the application. The VR input interface 140 may include one or more input devices. Example input devices include: a keyboard, a mouse, a game controller, or any other suitable device for receiving action requests and communicating the received action requests to the VR console 110. An action request received by the VR input interface 140 is communicated to the VR console 110, which performs an action corresponding to the action request. In some embodiments, the VR input interface 140 may provide haptic feedback to the user in accordance with instructions received from the VR console 110. For example, haptic feedback is provided when an action request is received, or the VR console 110 communicates instructions to the VR input interface 140 causing the VR input interface 140 to generate haptic feedback when the VR console 110 performs an action.

The VR console 110 provides media to the VR headset 105 for presentation to the user in accordance with information received from one or more of: the VR headset 105, and the VR input interface 140. Examples of VR consoles 110 include computers, video game consoles, and other computing devices.

In the example shown in FIG. 1, the VR console 110 includes an interface 142, an application store 145, an eye tracking module 150, and a virtual reality (VR) engine module 155. The interface 142 sends data to and receives data (e.g. image data, gaze data) from the virtual reality headset 105 via the wired connection 190.

The application store 145 stores one or more applications for execution by the VR console 110. An application is a group of instructions, that when executed by a processor, generates content for presentation to the user. Content generated by an application may be in response to inputs received from the user via movement of the HR headset 105 or the VR interface device 140. Examples of applications include: gaming applications, conferencing applications, video playback application, or other suitable applications.

The VR engine module 155 executes applications within the system environment 100 and receives gaze direction information from the eye tracking module 150. Based on the received information, the VR engine 155 determines how content images are to be processed and provided to the VR headset 105.

In one embodiment, the VR engine 155 determines, from the user's gaze direction, which region of the display 105 should be high resolution in order to match the user's gaze. For example, the VR engine 155 can estimate which pixels of the display 115 the gaze is focused on, and use those pixels as the center of the high resolution region (e.g. full resolution region). The VR engine 155 then generates resolution configuration data that specifies the location of the reduced resolution and full resolution regions of the display 115. This resolution configuration data is provided to the VR headset 105 via interface 142 so that the display 115 can be configured to support reduced and full resolution regions. The VR engine 155 then generates and provides image data to the virtual reality headset 105 for display in the reduced and full resolution versions. The location of the full resolution window is adjusted to match the user's gaze such that the portion of the display 115 being viewed by the user always appears to be clear and sharp.

Additionally, the VR engine module 155 performs an action within an application executing on the VR console 110 in response to an action request received from the VR input interface 140 and provides feedback to the user that the action was performed. The provided feedback may be visual or audible feedback via the VR headset 105 or haptic feedback via the VR input interface 140.

Figure 2A:
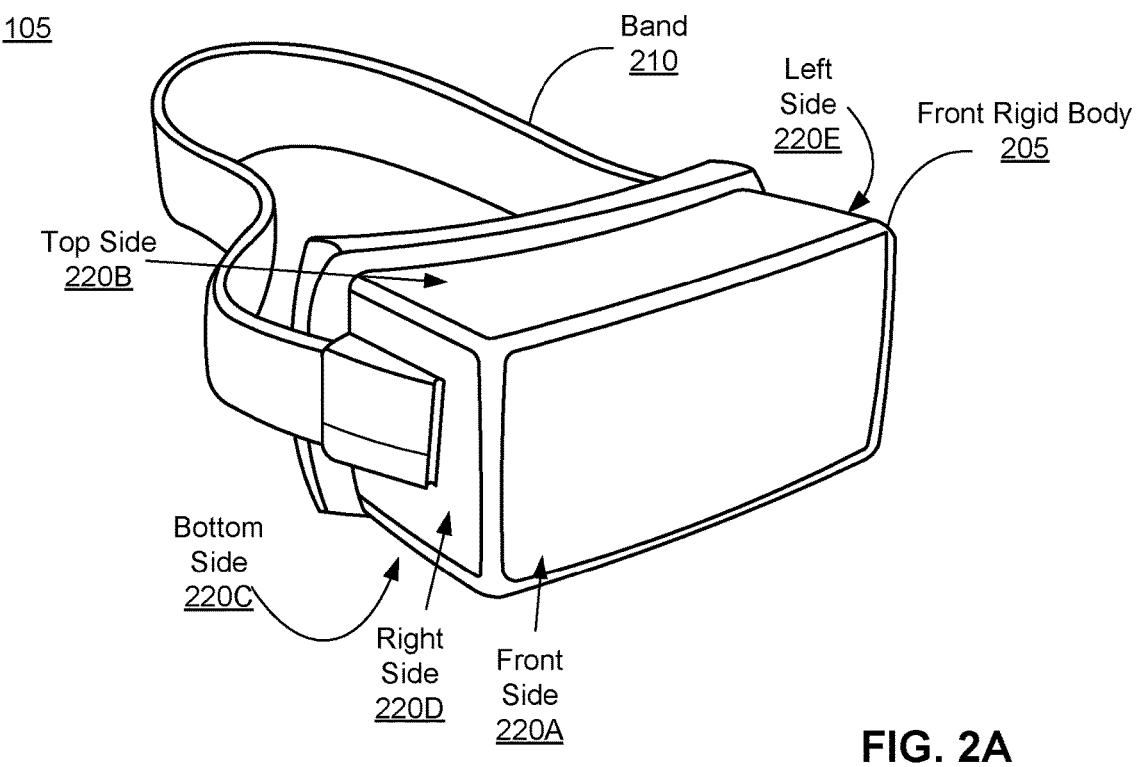
FIG. 2A is a wire diagram of a virtual reality headset, in accordance with an embodiment.

FIG. 2A is a wire diagram of a virtual reality (VR) headset 105, in accordance with an embodiment. The VR headset 105 includes a front rigid body 205 and a band 210. The front rigid body 205 includes one or more electronic display elements of the electronic display 115 (not shown) and the eye tracking sensors 118 (not shown). The front rigid body 205 includes a front side 220a, a top side 220b, a bottom side 220c, a right side 220d, and a left side 220e.

Figure 2B:
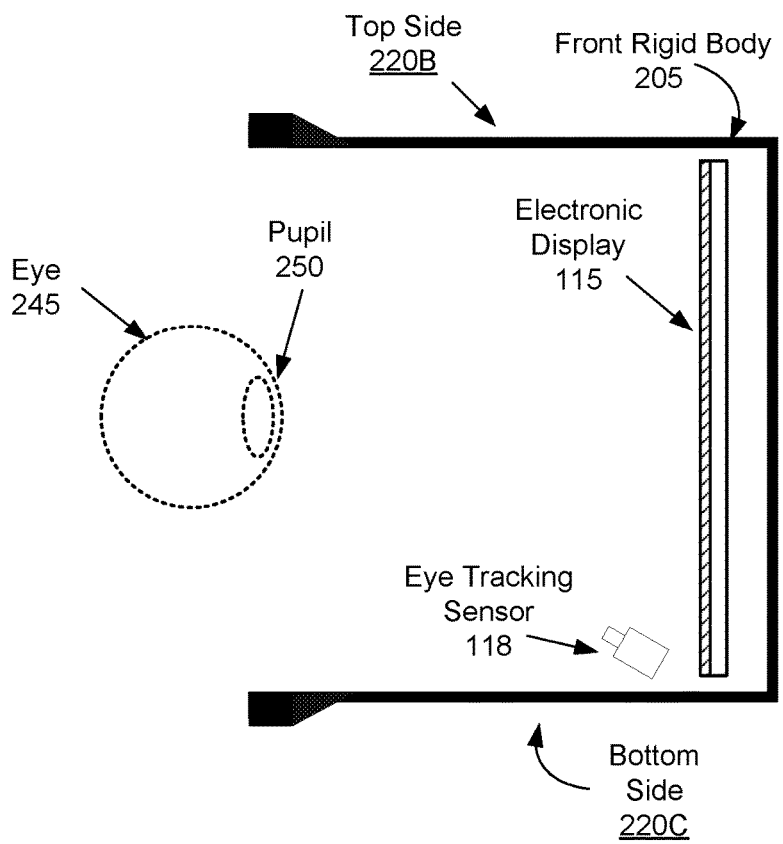
FIG. 2B is a cross section of the front rigid body of the embodiment of a VR headset shown in FIG. 2A.

FIG. 2B is a cross section of the front rigid body 205 of the embodiment of a VR headset 105 shown in FIG. 2A. The front rigid body 205 includes an electronic display 115, and an eye tracking sensor 118 that generates gaze data indicative of the direction of the eye's 245 gaze. The eye tracking sensor 118 is pointed at the pupil 250 such that movements of the pupil 118 can be captured. Some components may not be shown in FIG. 2B, such as an optical block between the eye 245 and display 115 that bends the light from the display 115.

Dual Data Driver Display

Figure 3:
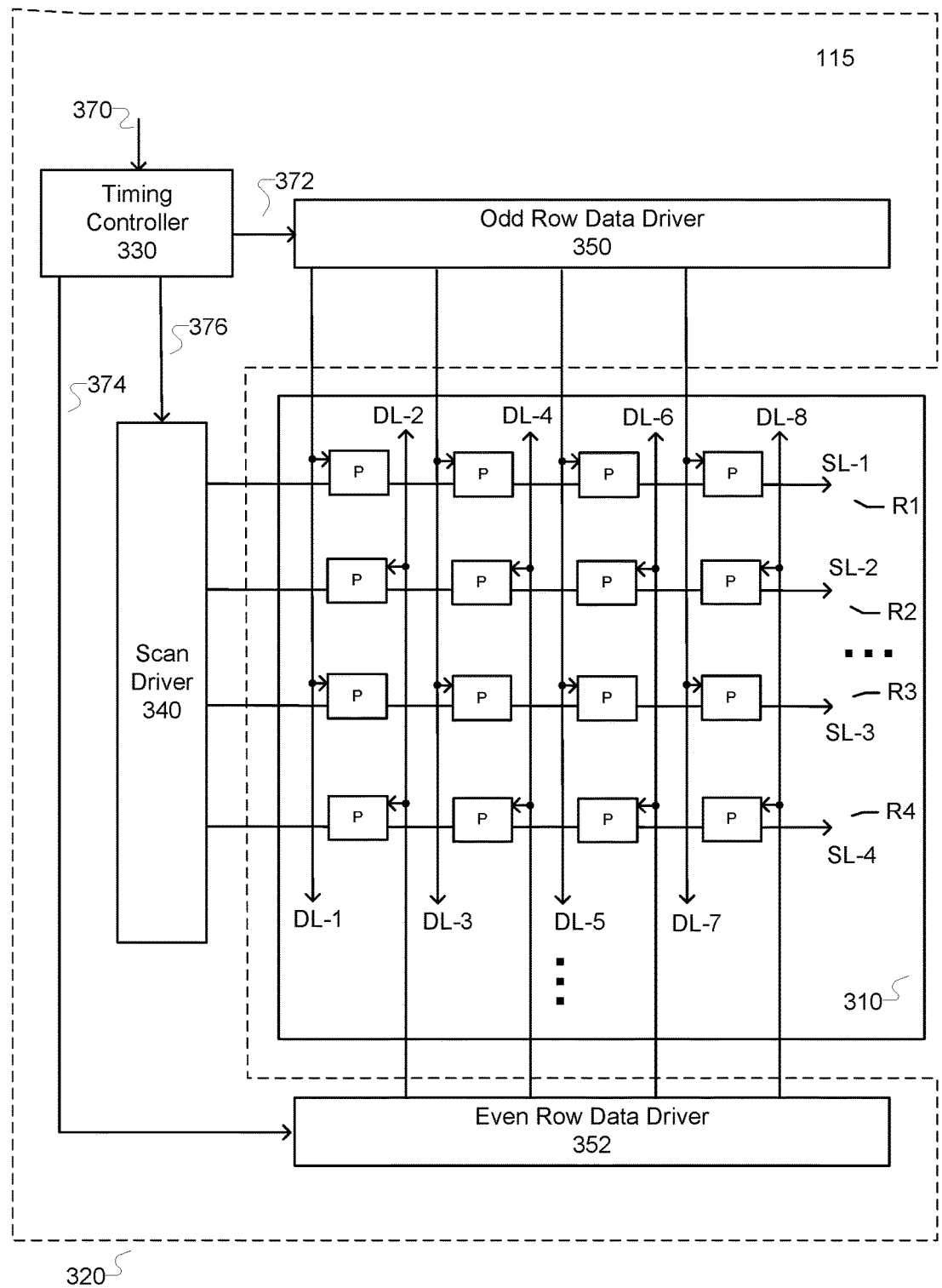
FIG. 3 is an electronic display with dual row drivers, according to an embodiment.

FIG. 3 is an electronic display 115 with dual row drivers, according to an embodiment. The electronic display 115 includes an active matrix display screen 310 and display circuitry 320. The display screen 310 includes an active matrix of pixels P organized in pixel rows (R1-R4) and pixel columns. Although not shown in FIG. 3, generally each pixel P includes multiple sub-pixels producing red, green, and blue light and there would be additional data lines DL connected to each of the sub-pixels.

The display screen 310 includes data lines DL and scan lines SL connected to the pixels P. Data lines DL carry data voltages to the pixels P that represent target brightness levels of the pixels. Scan lines SL carry scan pulses to the pixels P that scan the data voltages into the pixels P. Scan lines SL may also be referred to as gate lines. Only 16 pixels P, 4 scan lines SL and 8 data lines DL are shown in FIG. 3 for ease of illustration. However, the display screen 310 typically has a larger number of pixels P (e.g. millions of pixels P), scan lines SL and data lines DL.

Figure 4:
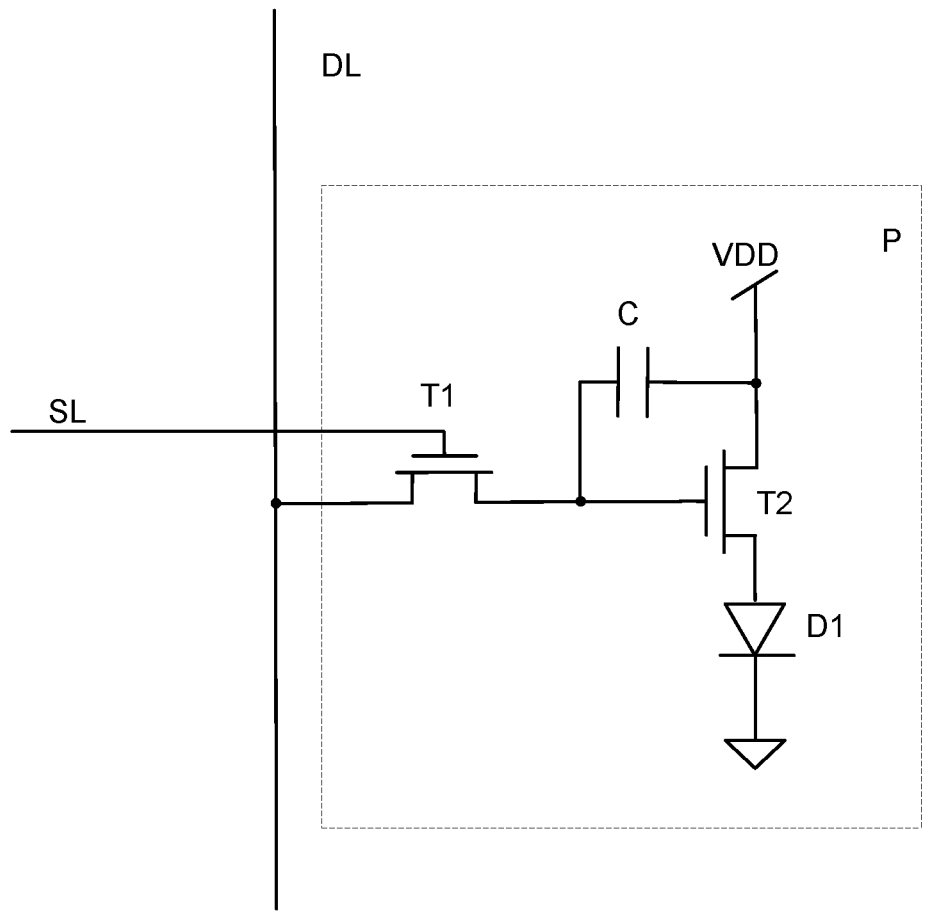
FIG. 4 is circuit diagram of a pixel P, according to an embodiment.

Referring briefly to FIG. 4, shown is a pixel P of the active matrix display screen 310, according to an embodiment. Pixel P can represent any of the pixels P from FIG. 3. The pixel P is an OLED pixel. The pixel P includes a scan transistor T1, a storage capacitor C, a driving transistor Td and an OLED D1. When a scan pulse is applied from the scan line SL to the gate of scan transistor T1, scan transistor T1 turns on and the data voltage on the data line DL is latched or scanned into the storage capacitor C. The data voltage stored in capacitor C turns on the driving transistor T2, which drives current through the OLED D1 in accordance with the level of the data voltage and causes the OLED D1 to emit light. In other embodiments the pixel P may have a different structure that uses additional transistors and electrical components other than those shown in FIG. 4.

Referring back to FIG. 3, each data line DL is connected to only half the pixel rows (R1-R4). The data lines DL can be divided into two subsets: odd data lines (DL-1, DL3, etc) and even data lines (DL-2, DL-4, etc). The two odd and even data lines alternate with each other. Odd data lines (DL-1, DL-3, etc) are connected only to odd pixel rows (R1, R3). The odd data lines (DL-1-DL3, etc) are not connected to even pixel rows (R2, R4), and are therefore electrically isolated from the even pixel rows (R2, R4). Even data lines (DL-2, DL-4, etc) are connected only to even pixels rows (R2, R4) but not odd pixels rows (R2, R4), and are therefore electrically isolated from the even pixel rows (R2, R4).

In other words, each pixel column is driven by a pair of data lines DL, and the pixels P in the column are connected in alternating manner between the pair of data lines DL. For example, data line DL-1 is connected to the pixels P in the odd rows (e.g. SL-1, SL-3). Data line DL-2 is only connected to the pixels P in the even rows (e.g. SL-2, SL-4).

The display screen 310 includes two data drivers and twice as many data lines DL as conventional displays because each data line DL is only connected to half the pixels P in a column, such as the odd pixel rows or the even pixel rows, but not both. By including twice as many data lines DL, the refresh rate of the display can be doubled because each subsequent pixel row can be scanned before the previous pixel row has completed its scanning. Alternatively, the scan time for each pixel row can be increased while maintaining the same refresh rate.

Figure 3A:
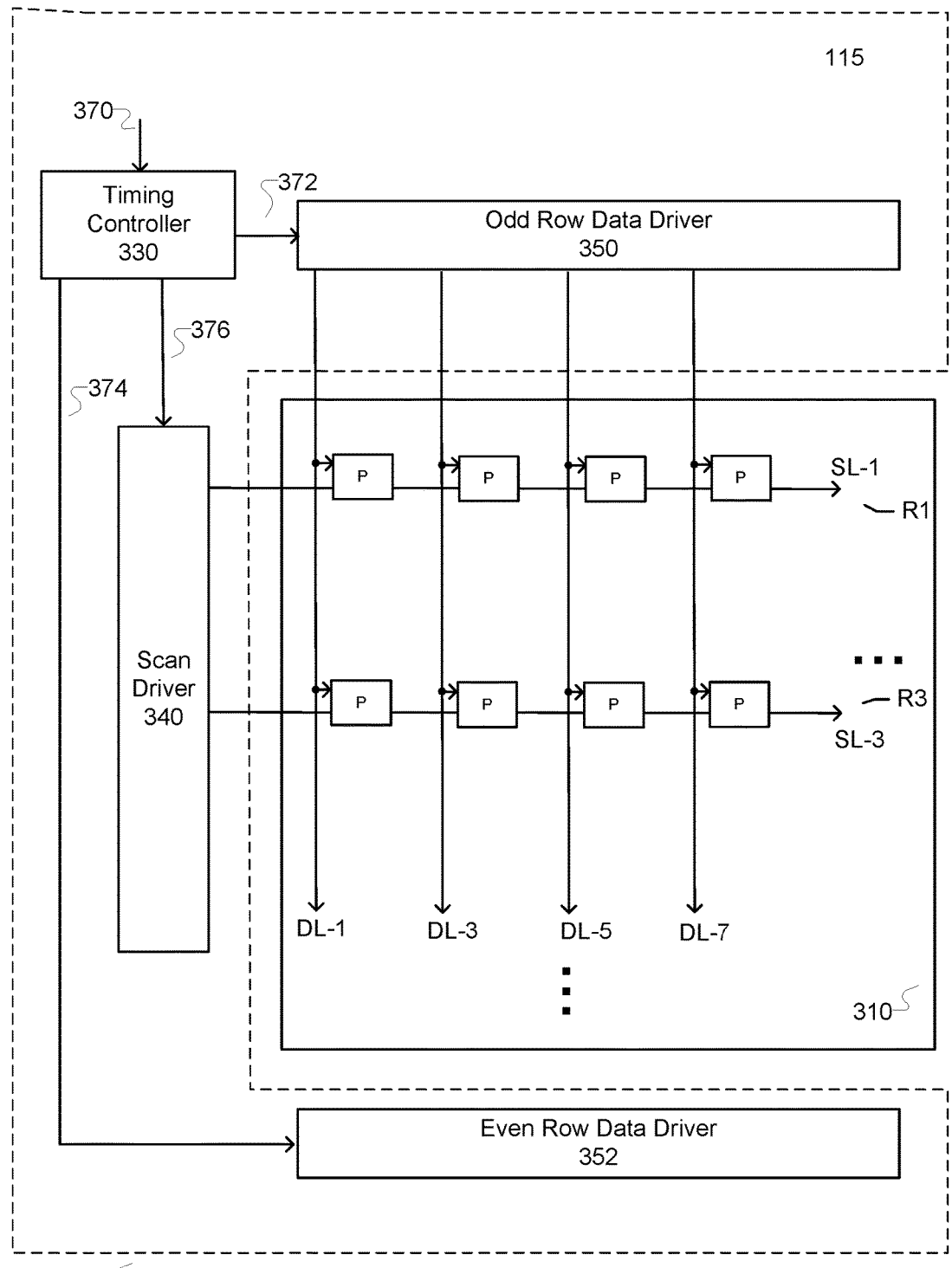
FIG. 3A is the display from FIG. 3 where only the odd pixel rows are illustrated, according to an embodiment.

FIG. 3A is the display from FIG. 3 where only the odd pixel rows are illustrated, according to an embodiment. The even pixel rows are hidden for ease of explanation. Odd scan line SL-1 is connected to all of the pixels in one odd pixel row R1. Odd scan line SL-3 is connected to all of the pixels in another odd pixel row R3. The odd data lines (DL-1, DL-3, etc) are connected to all of the odd pixel rows (R1, R3), but are not connected to any of the even pixel rows.

Figure 3B:
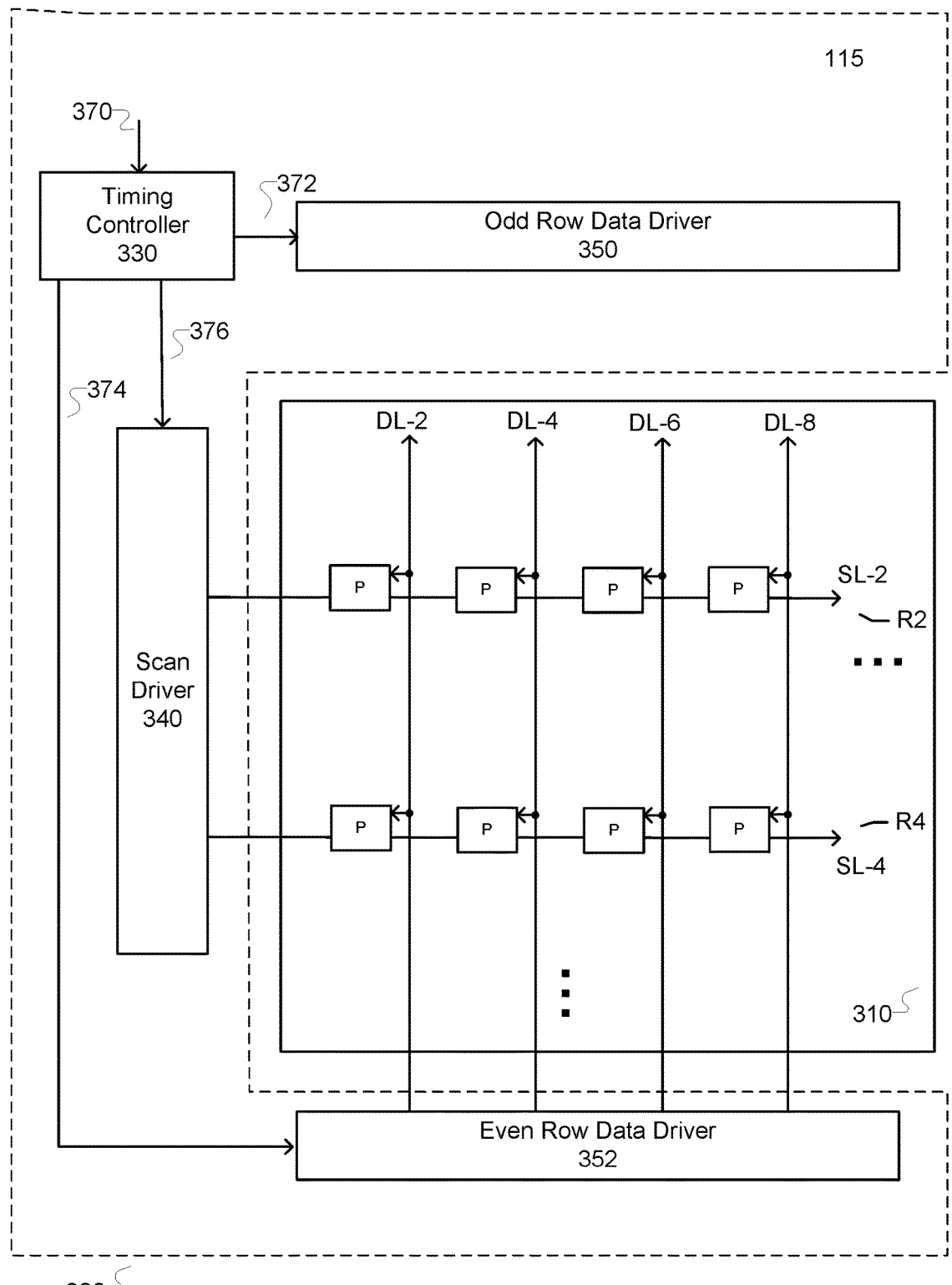
FIG. 3B is the display from FIG. 3 where only the even pixel rows are illustrated, according to an embodiment.

FIG. 3B is the display from FIG. 3 where only the even pixel rows are illustrated, according to an embodiment. The odd pixel rows are hidden for ease of explanation. Even scan line SL-2 is connected to all of the pixels in one even pixel row R2. Even scan line SL-4 is connected to all of the pixels in another even pixel row R4. The even data lines (DL-2, DL-4, etc) are connected to all of the even pixel rows (R2, R4), but are not connected to any of the odd pixel rows.

Referring back to FIG. 3, the display circuitry 320 includes a timing controller 330, an odd row data driver 350, an even row data driver 352 and a scan driver 340. The timing controller 330, odd row data driver 350, even row data driver 352, and scan driver 340 may all reside on a single integrated circuit (IC), or on separate ICs. In some embodiments the scan driver 340 may be fabricated with thin film transistors and be separate from the other circuits. In one embodiment, odd row data driver 350 and even row data driver 352 are located on opposite sides of the display screen 310. Odd row data driver 350 is located at the top of the display screen, and even row data driver 352 is located on the bottom side of the display screen 310.

The timing controller 330 receives image data 370 and allocates rows of the image data 370 between the odd data driver 350 and even data driver 352. Odd rows of image data 372 are delivered to the odd data driver 450. Even rows of image data 374 are delivered to the even data driver 352. The odd row data driver 350 converts the image data 372 into data voltages that are driven onto the data lines DL connected to the odd pixel rows (R1, R3). The even row data driver 352 converts the image data 374 into data voltages that are driven onto the data lines DL connected to the even pixel rows (R2, R4).

The timing controller 330 also provides gate timing control signals 376 to control the operation of the scan driver 340. The scan driver 340 generates scan pulses that are driven onto the scan lines SL. Each scan pulse scans in the data voltages to a pixel row. The pixels of a pixel row hold the data voltages in their respective storage capacitors.

Figure 5:
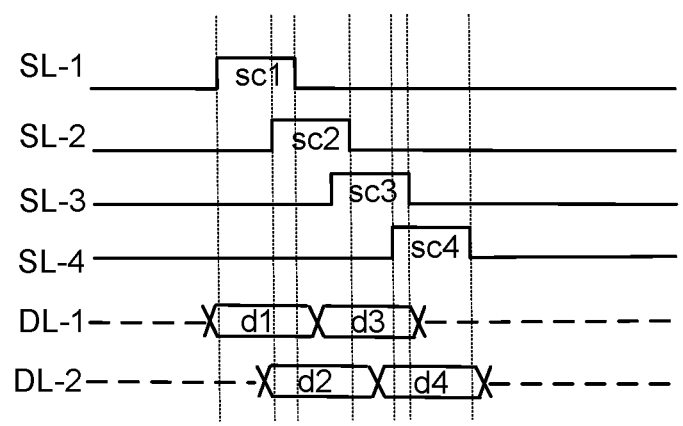
FIG. 5 is a timing diagram illustrating operation of the scan driver and data drivers, according to an embodiment.

Referring now to FIG. 5, illustrated is a timing diagram illustrating operation of the scan driver 340 and data drivers 350 and 352, according to an embodiment. The timing diagram includes signal waveforms for scan lines SL-1 through SL-4, and also for data lines DL-1 and DL2.

Data voltages d1 and d3 are driven onto data line DL-1 at different times. Scan pulse sc1 scans data voltage d1 into a pixel P in the first pixel row R1. Scan pulse sc3 scans data voltage d3 into a pixel P of the third pixel row R3.

Data voltages d2 and d4 are driven onto data line DL-2 at different times. Scan pulse sc2 scans data voltage d2 into a pixel P in the second pixel row R2. Scan pulse sc4 scans a data voltage d4 into a pixel P of the fourth pixel row R4.

Scan pulses sc1-sc4 are driven sequentially onto the scan lines SL. Each scan pulse overlaps with a previous scan pulse and next scan pulse in time. For example, scan pulse sc2 overlaps with scan pulse sc1 and scan pulse sc3. The scanning of each even pixel row thus overlaps with the scanning of each odd pixel row. Each pixel row can begin scanning before a previous pixel row has completed scanning. This scanning overlap allows the refresh rate of the display to be increased because the scanning of one row does not need to be completed before scanning of the next row begins. Similarly, the refresh rate can be maintained while increasing the time allowed per row to charge the pixel capacitors.

Configurable Resolution in Dual Driver Display

Figure 6A:
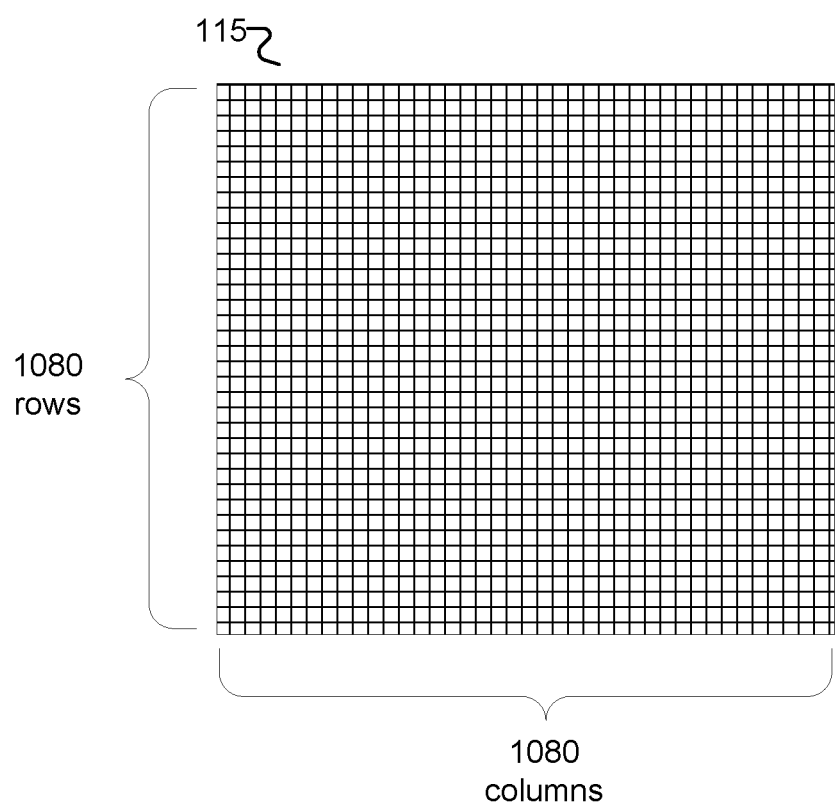
FIG. 6A is a diagram illustrating a display screen, according to an embodiment.

FIG. 6A is a diagram illustrating pixels of an electronic display 115, according to an embodiment. The display screen has a fixed native resolution of 1080×1080 (i.e. 1080 pixels wide, 1080 pixels tall). To achieve the best image quality, a frame of image data provided to the virtual reality headset 105 should match the native resolution of the display screen. However, transferring a video stream to the virtual reality headset 105 in a resolution that matches the native resolution of the display screen 310 can consume a large amount of bandwidth that exceeds the limits of the wired connection 190. In one embodiment, the electronic display 115 uses full resolution image frame data for one portion of the display screen, and uses reduced resolution image frame data for another portion of the display screen, thereby reducing the data bandwidth requirements of the wired connection 190.

Figure 6B:
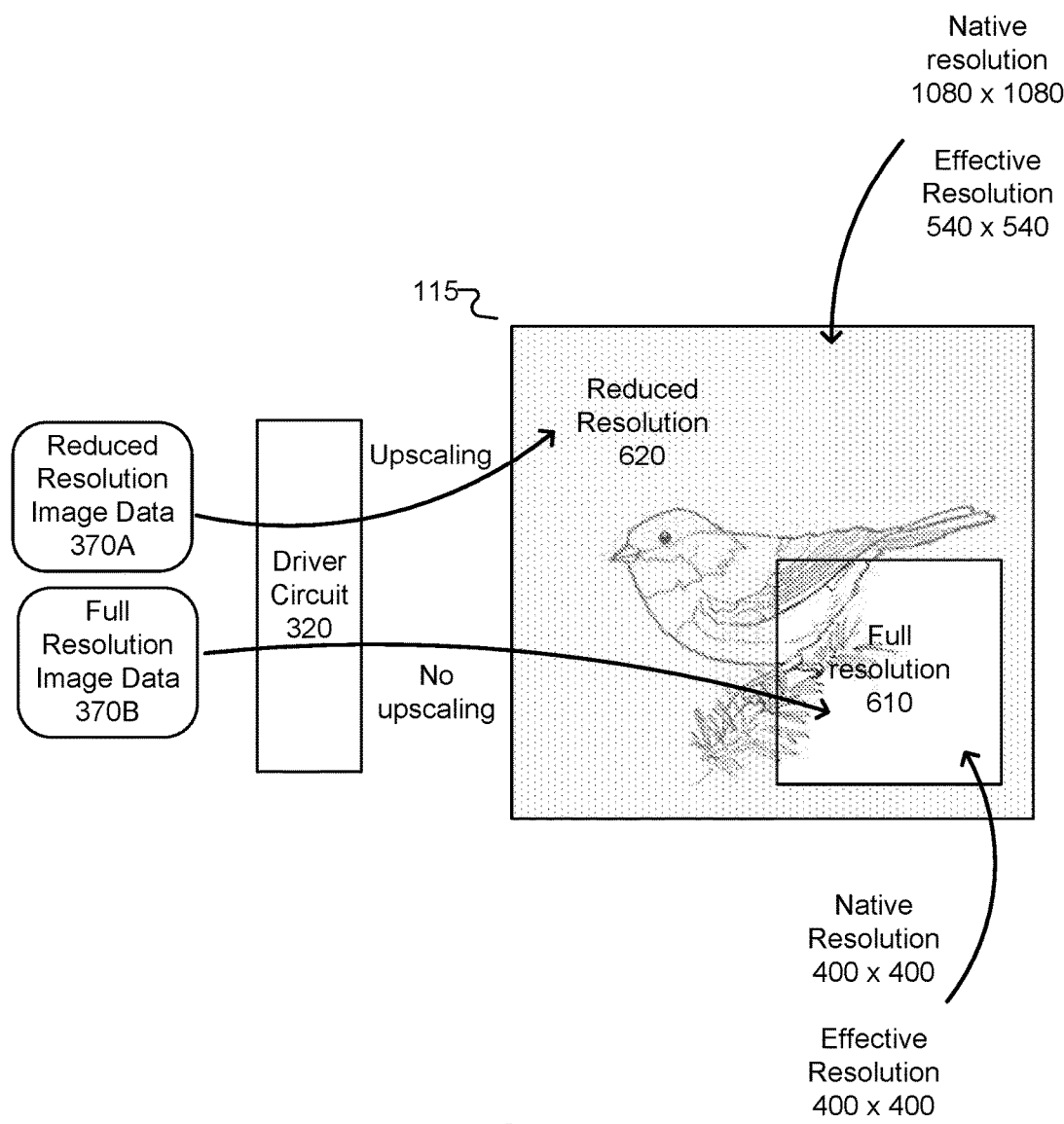
FIG. 6B is a diagram illustrating a display screen with configurable effective resolution.

FIG. 6B is a diagram illustrating a display screen of a display 115 with configurable effective resolution. The display 115 can be operated in a manner that causes it to have different effective resolutions in different regions of the display 115. Effective resolution may also be referred to herein as a supported resolution. The display 115 uses full resolution image data to display a full resolution image in one portion of the display, resulting in a full resolution region 610. The display uses partial resolution image data to display a partial resolution image in another portion of the display, resulting in a reduced resolution region 620.

The full resolution region 610 is shown as a window within and surrounded by the reduced resolution region 620. Image data 370B provided for the full resolution region 610 matches the native resolution of the full resolution region 610 and can be directly applied to the display screen 310 without upscaling. For example, the full resolution region 610 can have a native resolution of 400×400. It has an effective resolution of 400×400 because the image displayed in that region is generated from image frame data 370B having 400×400 resolution.

Image frame data 370A provided for the reduced resolution region 620 is lower than the native resolution of the reduced resolution region 620. The driver circuit 320 receives the reduced resolution image data 370A and upscales the image data before applying the upscaled image data to the display screen. For example, the reduced resolution region 620 can have a native resolution of 1080×1080. It has an effective resolution of 540×540 because the image displayed in that region is generated from image frame data 370A having 540×540 resolution. The image frame data 370A is upscaled by 2× in both the horizontal and vertical directions before it is displayed in the reduced resolution region 620.

In other embodiments the full resolution region 610 and reduced resolution region 620 may be different in size and shape. For example, the upper pixel rows of the display 115 may be the full resolution region while the lower pixel rows of the display 115 is the reduced resolution region. The sizes of the regions can be configured in any manner from the entire panel down to a single color in a row. Beneficially, operating only a portion of the display 115 in full resolution reduces the required bandwidth for image data transferred from the virtual reality console 110 to the virtual reality headset 105.

Figure 7:
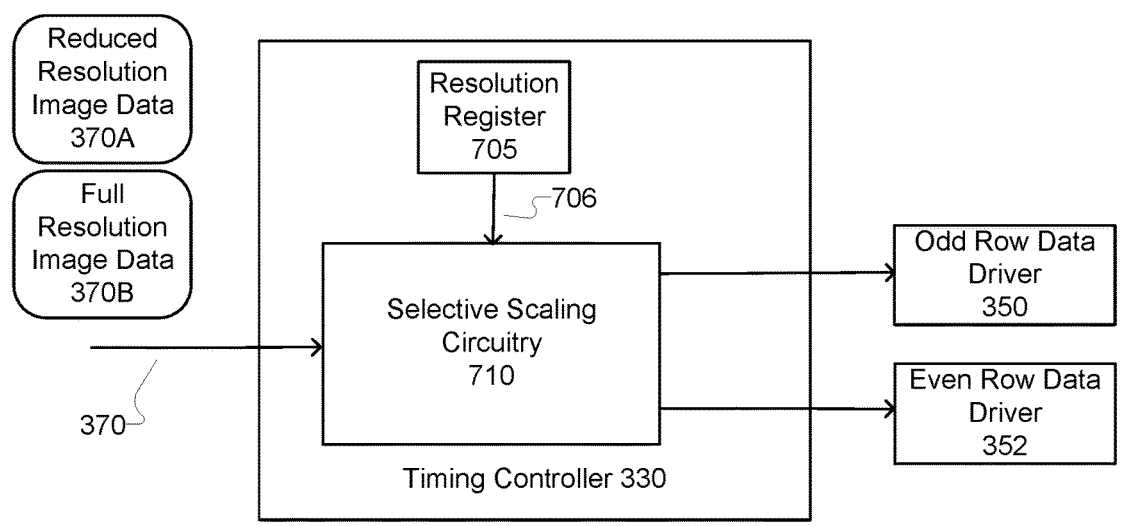
FIG. 7 illustrates a timing controller and data drivers supporting configurable effective resolution, according to an embodiment.

FIG. 7 illustrates a timing controller 330 and data drivers 350 and 352 supporting configurable resolution, according to an embodiment. The timing controller 330 is shown with a resolution register 705 and scaling circuitry 710. In one embodiment, the resolution register 705 can be a portion of a memory dedicated to storing configuration data, or can be a dedicated circuit for storing resolution configuration data.

The resolution register 705 stores resolution configuration data 706 describing regions of the display 115 that are to be operated in full resolution and regions of the display 115 that are to operate in reduced resolution. For example, the resolution configuration data 706 may include row/column coordinates of the boundaries of the full resolution region 610 and row/column coordinates of the boundaries of the reduced resolution region 620. The resolution configuration data 706 may be provided by the VR console 110 and then stored in the resolution register 705. The resolution configuration data 706 may also include information describing whether the resolution is being reduced in a vertical direction, horizontal direction, or both. The resolution configuration data 706 may also include information describing an amount of upscaling (e.g. 2×, 4×, none) that should be applied in each region of the display.

The selective scaling circuitry 710 receives image data 370 provided by the VR console 110, and also reads the resolution configuration data 706 from the resolution register 705. For a single image frame, the image data 370 can include both reduced resolution image data 370A and full resolution image data 370B. The scaling circuitry 710 uses the resolution configuration data 706 in determining which portions of the image data 370 are reduced resolution image data 370A intended for the reduced resolution region and which are full resolution image data 370B intended for the full resolution region. For portions of the image data 370 intended for the full resolution region 610 (i.e. full resolution image data 370A), the data does not need upscaling and is directly passed on to the odd row data driver or even row data driver 352. For portions of the image data 370 intended for the low resolution region (i.e. reduced resolution image data 370A), the scaling circuitry 720 upscales the image data 370 in the vertical direction, horizontal direction, or both.

The upscaling allows low resolution image data 370A to properly fill all of the pixels in the reduced resolution region 620. Typically upscaling involves duplicating image pixel data without using interpolation. Duplicating image pixel data in the vertical direction can include providing the same row of image data 370 to both the odd row data driver 350 and even row data driver 352, which results in the same image being displayed in two adjacent pixel rows. Duplicating image pixel data in the horizontal direction can include duplicating image pixel data across columns such that the same image pixel data is provided to adjacent pixels in a row. In other embodiments, the upscaling can include interpolation between adjacent pixels.

Figure 8A:
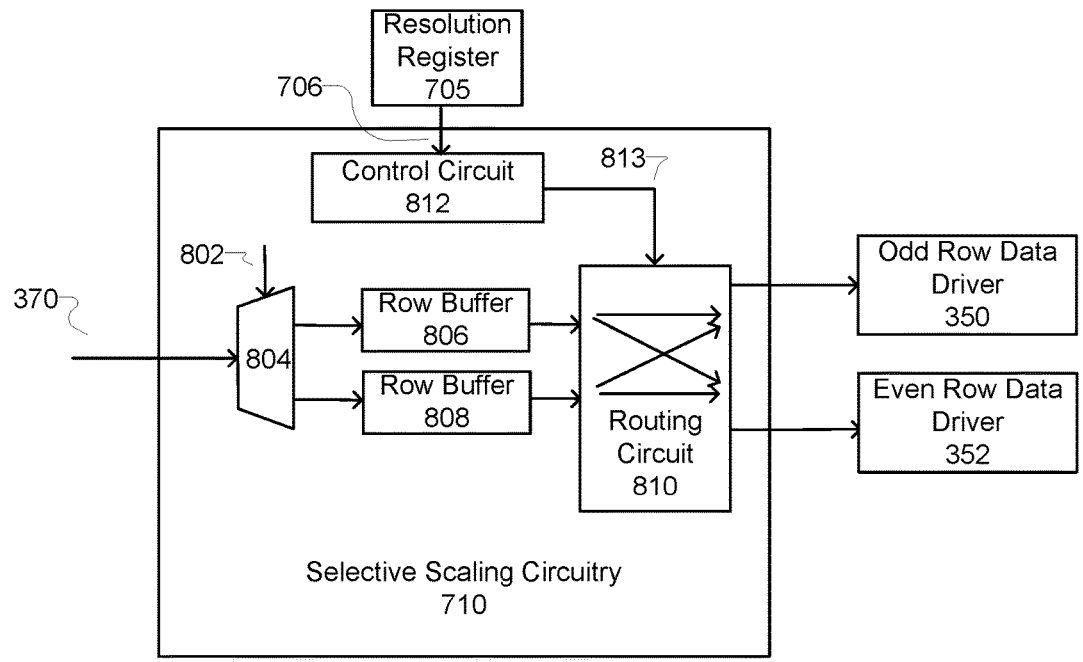
FIG. 8A illustrates selective scaling circuitry supporting configurable vertical resolution, according to one specific embodiment.

FIG. 8A illustrates selective scaling circuitry 710 supporting configurable vertical resolution, according to one specific embodiment. The selective scaling circuitry 710 includes a de-multiplexer 804, row buffers 806 and 808, routing circuit 810 and control circuit 812. This embodiment of the selective scaling circuitry 710 can duplicate rows of image data and provide the duplicated rows to both the odd row data driver 350 and even row data driver 352, which allows for adjustment of vertical resolution. The circuitry shown in FIG. 8 is just one example of circuitry for adjusting vertical resolution, and in other embodiments other types of circuitry are possible.

De-multiplexer 804 receives the image data 370 and directs rows of the image data 370 to row buffer 806 or row buffer 808. De-multiplexer 804 is controlled by multiplexer control signal 802. Multiplexer control signal 802 switches states under control of the image data row clock (i.e. with each image data row) such that rows of image data are stored in alternating manner between row buffer 806 and row buffer 808. Routing circuit 810 selectively directs rows of image data stored in row buffer 806 and 808 to odd row data driver 350 or even row data driver 352.

Control circuit 812 generates one or more routing control signals 813 that control the routing of rows through the routing circuit 810. Control circuit 812 generally changes the configuration of the routing circuit 810 at a rate that matches the scan frequency of the display. The register configuration data 706 sets at which row to switch from reduced resolution mode to full resolution mode and back. Thus, the state of the routing control signals 813 is controlled depending on whether an incoming row of the image data 370 is supposed to be handled in reduced resolution or full resolution mode, as indicated by the resolution configuration data 706 read from the resolution register 705. This is explained in greater detail by reference to FIG. 9A-9H.

Figure 9A:
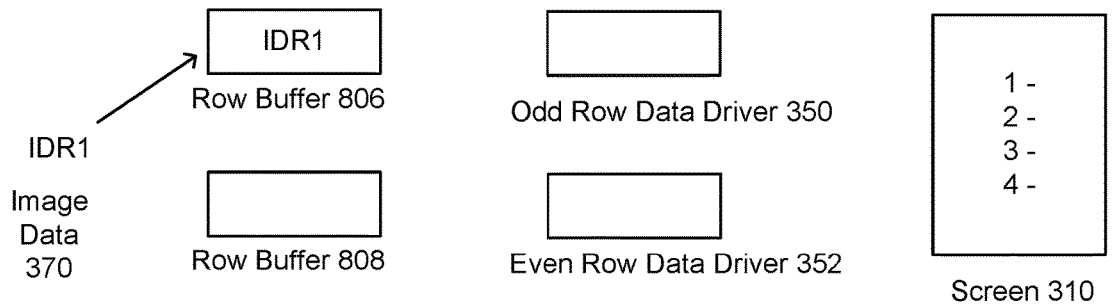
FIG. 9A-9H illustrate operation of the display when operating in different resolution modes, according to an embodiment.
Figure 9B:
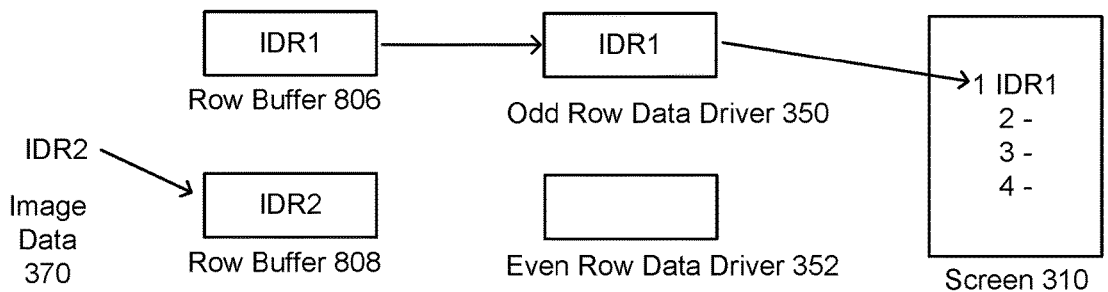
Figure 9C:
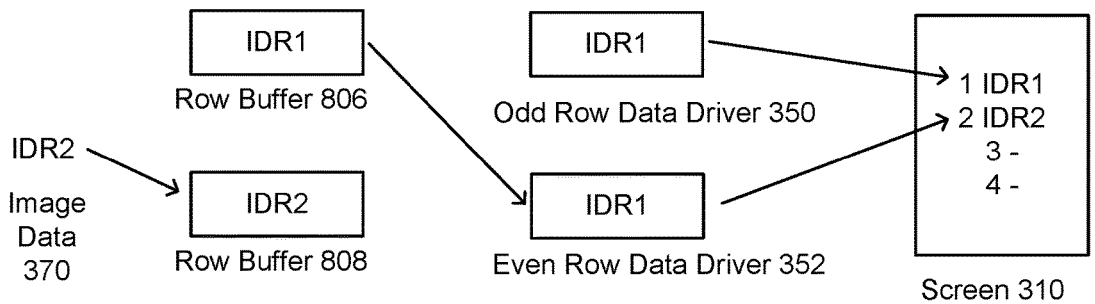
Figure 9D:
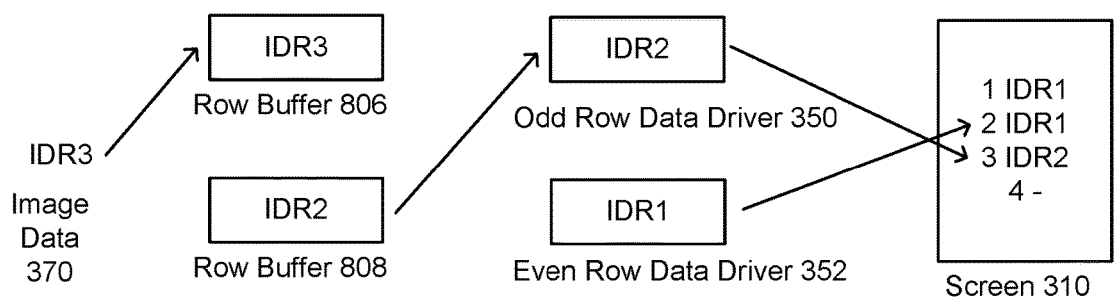
Figure 9E:
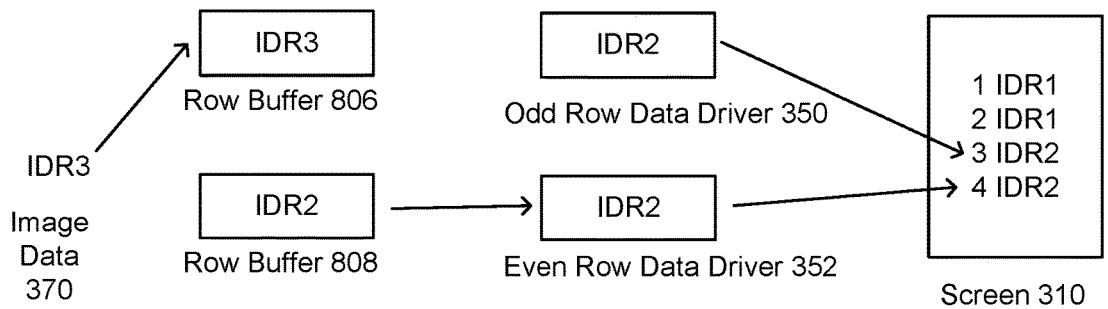
Figure 9F:
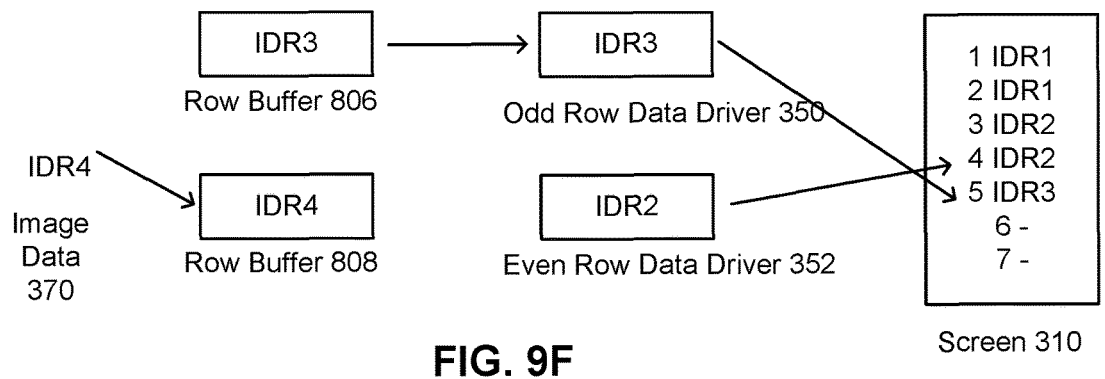
Figure 9G:
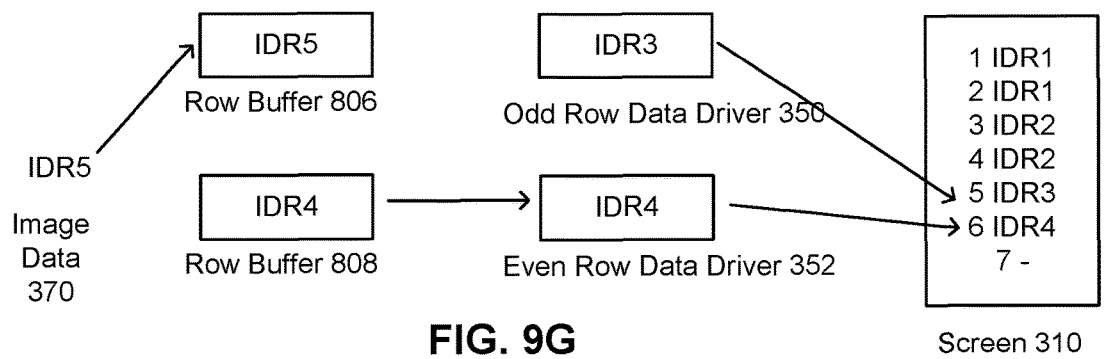
Figure 9H:
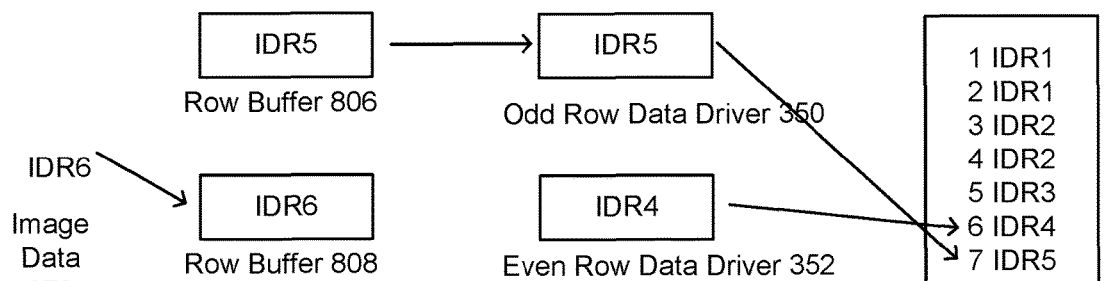

FIG. 9A-9H illustrate operation of the display 115 supporting different resolutions for different display regions, according to an embodiment. In FIG. 9A-9H, the reduced resolution region of the display occupies pixel rows 1-4 and that the full resolution region of the display occupies pixel rows 5-7. FIG. 9A-9E illustrate operation of the display when operating in reduced resolution mode for the first four pixel rows of the display, which is the reduced resolution region. FIG. 9F-9H illustrate operation of the display when operating in full resolution mode for pixel rows five through seven, which is the full resolution region.

Initially the display is in reduced region mode of operation for pixel rows one through four where pixel duplication is needed. In FIG. 9A, an image data row IDR1 is received and stored into row buffer 806.

In FIG. 9B, an image data row IDR2 is received and stored into row buffer 808. At the same time, image data row IDR1 is routed from row buffer 806 to odd row data driver 350 and scanned into the first pixel row of the display screen 310.

In FIG. 9C, while image data row IDR2 is still being stored into row buffer 808, image data row IDR1 is now routed from row buffer 806 to even row data driver 352 and scanned into the second pixel row of the display screen 310.

In FIG. 9D, an image data row IDR3 is received and stored into row buffer 806. At the same time, image data row IDR2 is routed from row buffer 808 to the odd row data driver 350 and scanned into the third pixel row of the display screen 310.

In FIG. 9E, while image data row IDR2 is still being stored into row buffer 806, image data row IDR2 is now routed from row buffer 808 to the even row data driver 352 and scanned into the fourth pixel row of the display screen 310.

The display now switches to full resolution mode of operation for pixel rows five through seven where pixel duplication is not needed. In FIG. 9F, an image data row IDR4 is received and stored into row buffer 808. At the same time, image data row IDR3 is routed from row buffer 806 to the odd row data driver 350 and scanned into the fifth pixel row of the display screen 310.

In FIG. 9G, an image data row IDR5 is received and stored into row buffer 806. At the same time, image data row IDR4 is routed from row buffer 808 to the even row data driver 352 and scanned into the sixth pixel row of the display screen 310.

In FIG. 9H, an image data row IDR6 is received and stored into row buffer 808. At the same time, image data row IDR5 is routed from row buffer 806 to the odd row data driver 350 and scanned into the seventh pixel row of the display screen 310.

It should be noted that, in reduced resolution mode, the incoming image row clock is half the speed of the scan clock scanning the rows into the display screen. In full resolution mode, the incoming row image row clock is the same as the scan clock scanning the rows into the display screen.

Figure 8B:
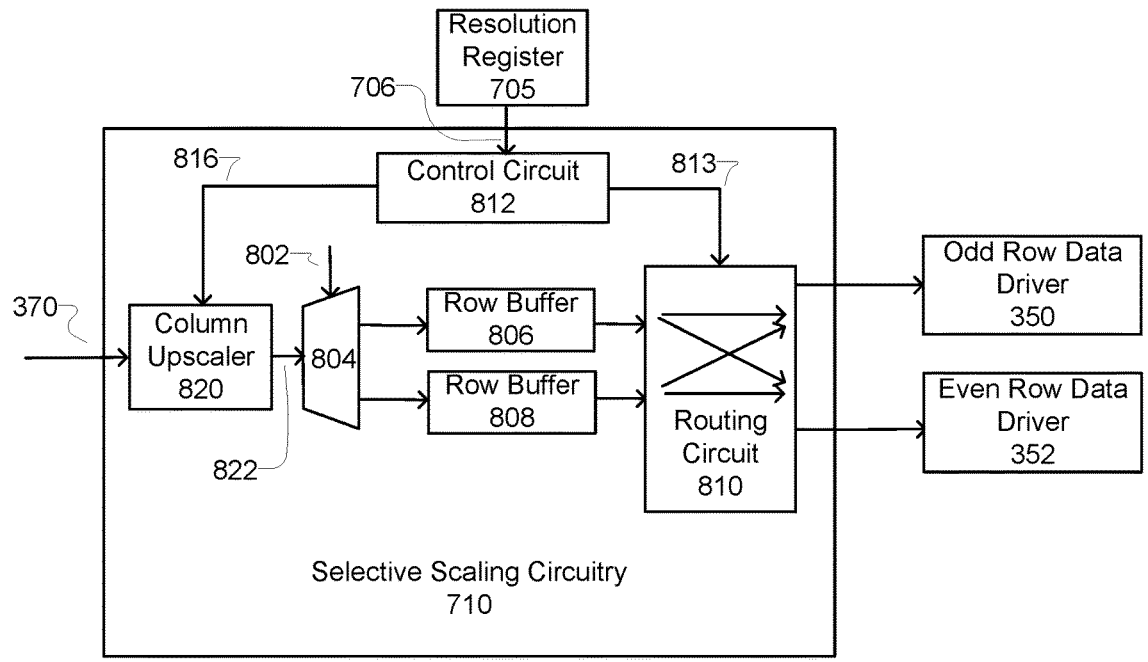
FIG. 8B illustrates selective scaling circuitry supporting configurable horizontal and vertical resolution, according to another embodiment.

FIG. 8B illustrates selective scaling circuitry 710 supporting configurable horizontal and vertical resolution, according to another embodiment. The selective scaling circuitry 710 of FIG. 8B is similar to the selective scaling circuitry 710 of FIG. 8A, but now includes a column upscaling circuit 820, which allows for adjustment of effective horizontal resolution. The column upscaling circuit 820 can selectively duplicate pixels of the image data 370 across pixel columns so that reduced resolution image data can be upscaled to the native resolution of the display screen.

Control circuit 812 generates one or more control signals 816 that control whether the column upscaler 820 should upscale the incoming data 370. When the register configuration data indicates that incoming data is intended for the reduced resolution region 620 of the screen, the control circuit 812 generates the control signal 816 in one state (e.g. logic high) to enable horizontal upscaling. When the register configuration data indicates that incoming data is intended for the reduced resolution region 610 of the screen, the control circuit 812 generates the control signal 816 in another state (e.g. logic low) to disable horizontal upscaling. Thus, the state of the control signals 816 is controlled depending on whether an incoming portion of the image data 370 is supposed to be handled in reduced resolution or full resolution mode, as indicated by the resolution configuration data read from the resolution register 705.

The column upscaler 820 outputs image data 822 that may or may not be horizontally upscaled, depending on whether upscaling was needed. In any case, a row of the image data 822 now includes data for a number of pixels that matches a number of pixels in a pixel row of the display screen 310. De-multiplexer 804 receives the image data 370 and directs rows of the image data 370 to row buffer 806 or row buffer 808.

In another embodiment, different amounts of upscaling may be applied to different portions of the image data 370. For example, a high amount of upscaling (e.g. 4×) may be applied to image data intended for one display region, while a low amount of upscaling (e.g. 2×, no upscaling) may be applied to image data intended for another display region.

Eye Tracking Control of Display Resolution

Figure 10A:
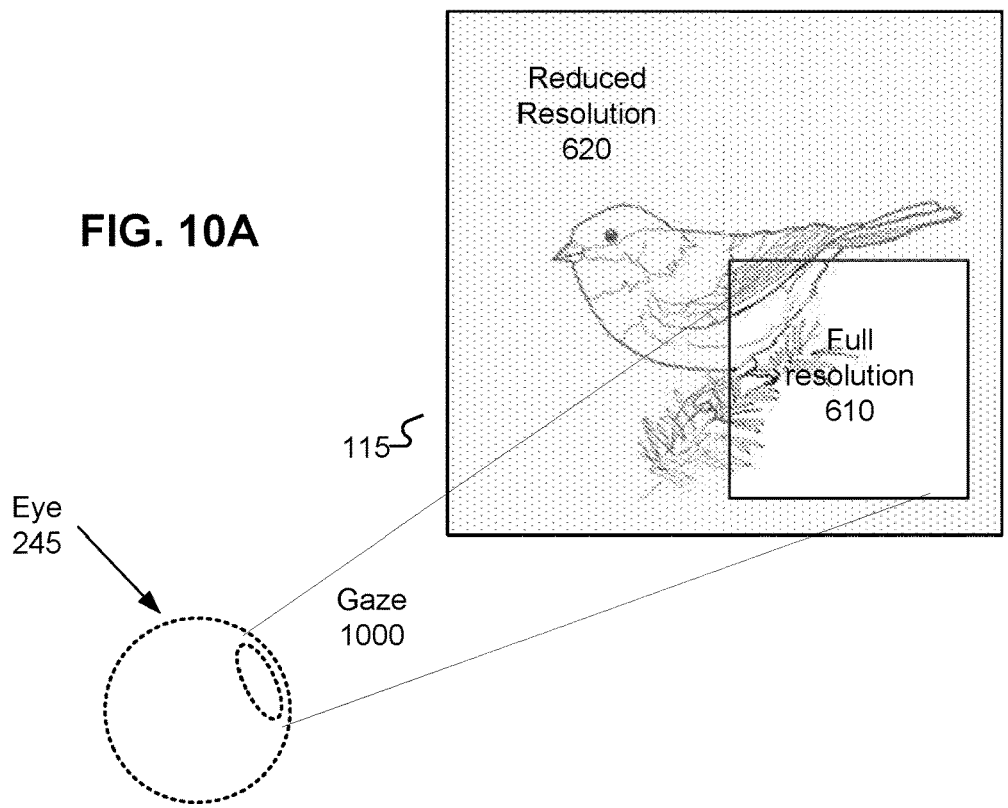
FIGS. 10A and 10B are diagrams illustrating the use of eye tracking to control a full resolution region of the display, according to an embodiment.
Figure 10B:
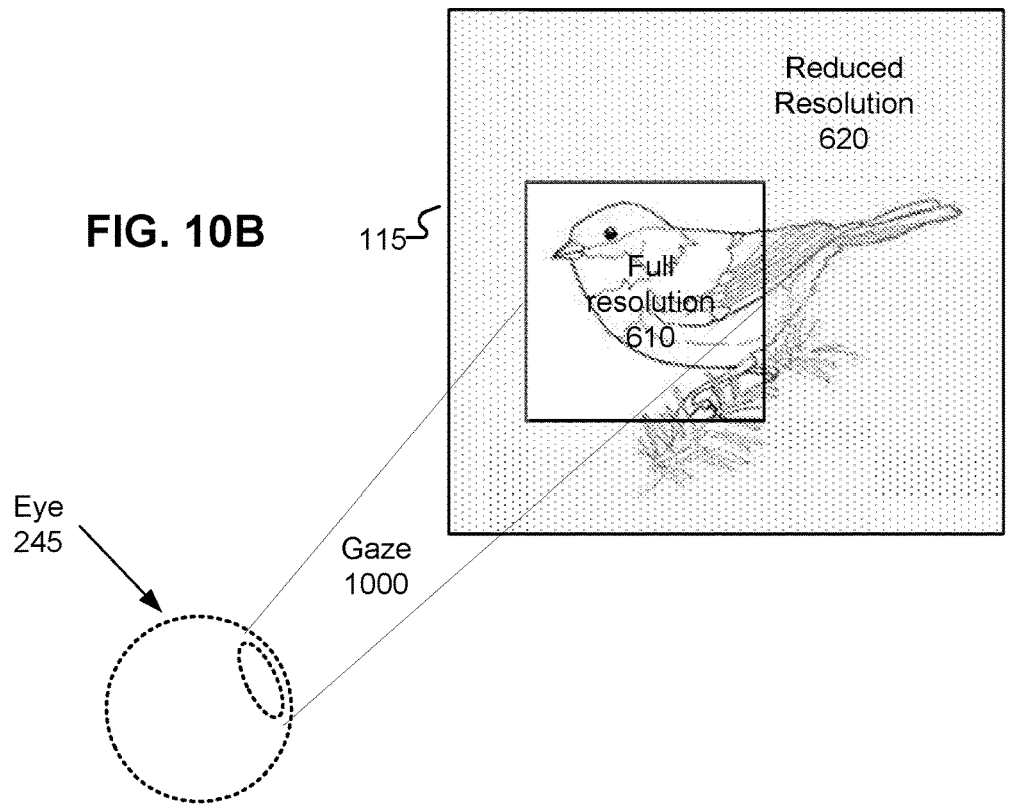

FIGS. 10A and 10B are diagrams illustrating the use of eye tracking to control a full resolution region 710 of the display 115, according to an embodiment. FIG. 10A includes an eye 245 having a gaze 1000 directed to a portion of the display 115. The display 115 is controlled such that the full resolution region 610 tracks the user's gaze 1000. For example, in FIG. 10B, the gaze direction 1000 has moved to the left. As a result, the full resolution region 610 is moved to the left to match the user's new gaze 1000.

In a human eye, the foveal region of the retina is the only part of the retina that permits 100% visual acuity. In a VR headset 105 where the display 115 is placed close to the user's eye 245, only a small portion of the display 100 is viewed by foveal region anyways while the rest of the display 115 is viewed by other parts of the retina. Thus, to the human eye, there is no loss in clarity if the portion of the display outside of the foveal region is not in full resolution.

Figure 11:
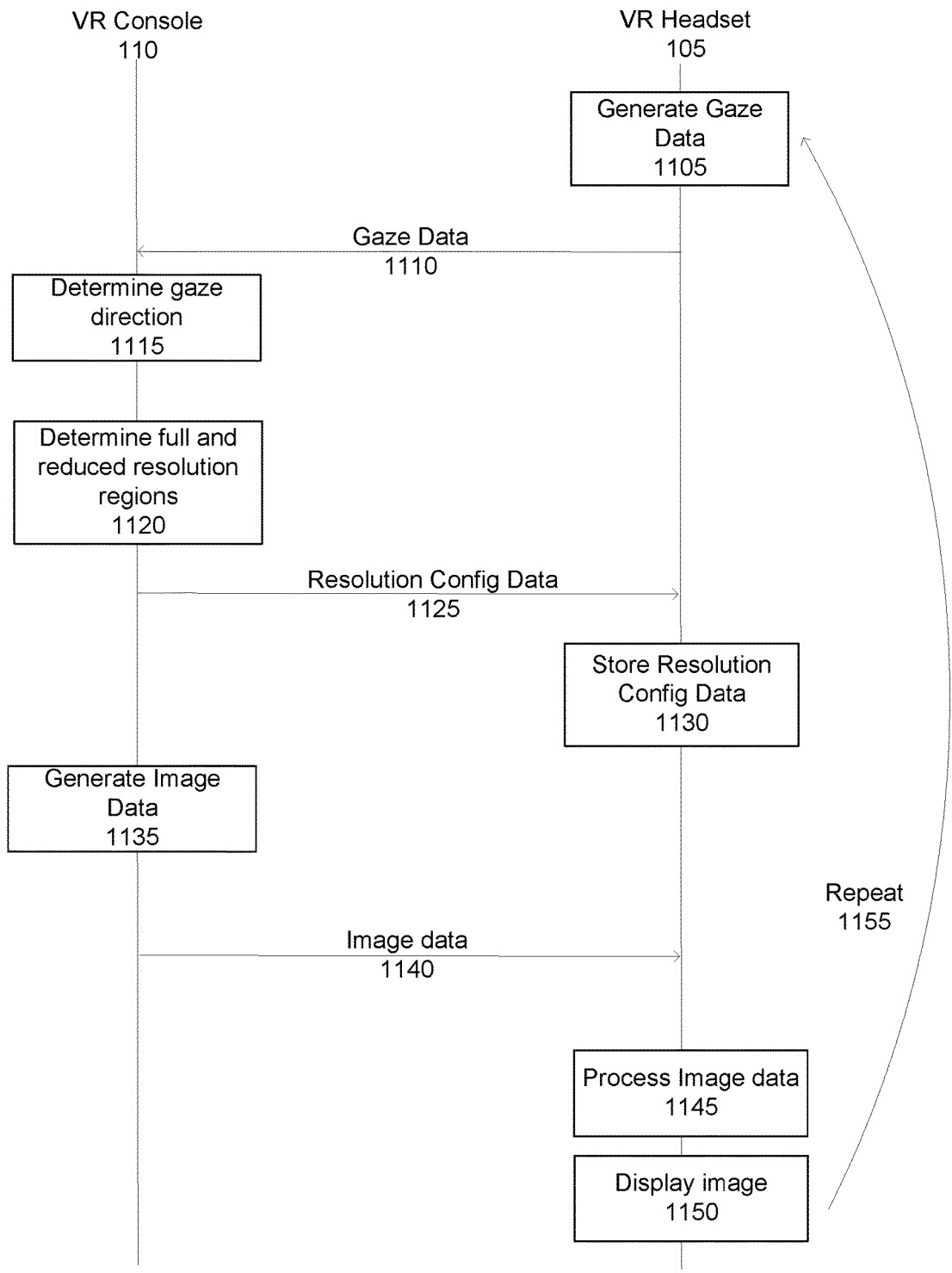
FIG. 11 is an interaction diagram for a virtual reality system that uses eye tracking to control a full resolution region of the display, according to an embodiment.

FIG. 11 is an interaction diagram for using eye tracking to control a full resolution region of the display 115, according to an embodiment. The VR headset 105 tracks the eye and generates gaze data indicative of a gaze direction of the user's eye. The VR headset 105 transmits 1105 the gaze data to the VR console 110. The VR console 110 receives the gaze data and analyzes the gaze data to determine 1115 the user's gaze direction.

The VR console 110 determines, from the gaze direction, the region of the display that is to be full resolution and the region that is to have reduced resolution. The VR console 110 attempts to match the full resolution region with the gaze direction of the user in order to track the user's eye movements. The VR console 110 transmits 1125 resolution configuration data describing the adjusted location of the full resolution region, the adjusted location of the reduced resolution region or both sets of locations to the VR headset. The VR headset 105 receives the resolution configuration data and stores 1130 the resolution configuration data in a resolution register. In one embodiment, steps 1120, 1125, and 1130 result are steps involved in the adjustment of the location of the full resolution region 620.

The VR console 110 then generates 1135 image data for display at the VR headset 105. In each image frame, part of the image data is for the reduced resolution region 620 of the display, and part of the image data is for the full resolution region 610 of the display. The VR console 110 transmits 1140 the image data to the VR headset 105. The VR headset 105 processes 1145 the image data in accordance with the resolution configuration data. The processing includes upscaling portions of the image data corresponding to the reduced resolution region 620 of the display, and not upscaling portions of the image data corresponding to the full resolution region 610 of the display. The VR headset 105 then displays 1150 an image that has a full resolution region 610 and a partial resolution region 620 by providing the image data to the data drivers 350 and 352.

The process also repeat s1155 continuously at periodic intervals so that the full resolution region 610 is periodically adjusted to track the user's gaze.

Other Considerations

Figure 12:
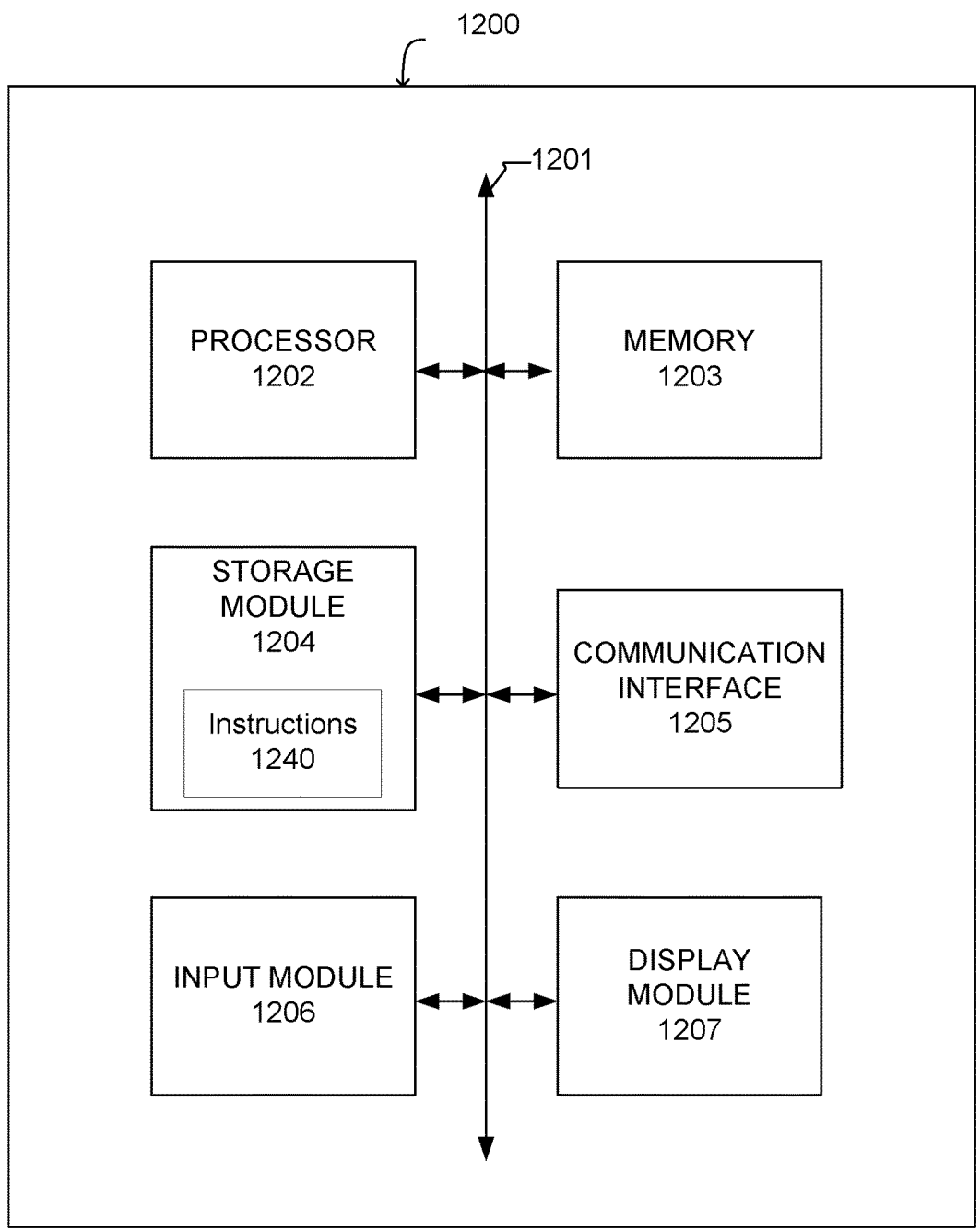
FIG. 12 illustrates the hardware architecture of computing device, according to one embodiment.

FIG. 12 illustrates the hardware architecture of computing device 1200, according to one embodiment. In some embodiments, the computing device 1200 may be used as VR console 110. The computing device includes components such as a processor 1202, a memory 1203, a storage module 1204, an input module (e.g., keyboard, mouse, and the like) 1206, a display module 1207 and a communication interface 1205, exchanging data and control signals with one another through a bus 1201. The storage module 1204 is implemented as one or more non-transitory computer readable storage media (e.g., hard disk drive), and stores software instructions 1240 that are executed by the processor 1202 in conjunction with the memory 1203 to implement the operations of the eye tracking module 150, virtual reality engine module 155, or other operations described herein. Operating system software and other application software may also be stored in the storage module 1204 to run on the processor 1202.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosed embodiments are intended to be illustrative, but not limiting, of the scope of the disclosure, which is set forth in the following claims.

What is claimed is:

1. A display device comprising:
   a display screen comprising a plurality of pixels organized into pixel columns and pixel rows;
   a resolution circuit to store resolution configuration data indicative of a location of a first region of the display screen operating in reduced resolution and indicative of a location of a second region of the display screen operating in full resolution; and
   a selective scaling circuit to receive image data and to process the image data based on the resolution configuration data, the selective scaling circuit upscaling a first portion of the image data for the first region of the display screen, wherein upscaling the first portion of the image data comprises duplicating the first portion of the image data over adjacent pixels of the display screen in at least one direction, and not upscaling a second portion of the image data for the second region of the display screen.

2. The display device of claim 1, wherein the upscaling comprising duplicating the first portion of the image data across one or more of the pixel columns.

3. The display device of claim 1, wherein the upscaling comprises duplicating the first portion of the image data across one or more of the pixel rows.

4. The display device of claim 1, wherein the display device comprises:
  a first data driver for a first subset of the pixel rows of the display screen; and
  a second data driver for a second subset of the pixels rows of the display screen,
  wherein the selective scaling circuit upscales the image data by providing a row of image data to both the first data driver and the second data driver.

5. The display device of claim 4, wherein the selective scaling circuit includes:
  a row buffer to store the row of image data; and
  a routing circuit to route the row of image to both the first data driver and the second data driver.

6. The display device of claim 1, further comprising:
  a timing controller, wherein the resolution circuit and selective scaling circuit are part of the timing controller.

7. The display device of claim 1, wherein the display device is a virtual reality headset that comprises:
  an interface to a virtual reality console, the image data received from the virtual reality console via the interface.

8. The display device of claim 7, wherein the interface receives the resolution configuration data from the virtual reality console via the interface.

9. The display device of claim 1, wherein the image data is received from the virtual reality console via a wired connection between the virtual reality console and the virtual reality headset.

10. The display device of claim 1,
  wherein the first region of the display screen has a first native resolution and operates in reduced resolution by having an effective resolution lower than the first native resolution, and
  wherein the second region of the display screen has a second native resolution and operates in full resolution by having an effective resolution that is same as the second native resolution.

11. The display device of claim 10, wherein the first native resolution has the same pixel density as the second native resolution.

12. The display device of claim 1,
  wherein the second region of the display screen is surrounded by the first region of the display screen.

13. A method of operation in a display device having a display screen, the method comprising:
  storing resolution configuration data indicative of a location of a first region of the display screen operating in reduced resolution and indicative of a location of a second region of the display screen operating in full resolution; and
  receiving image data and processing the image data based on the resolution configuration data, the processing comprising upscaling a first portion of the image data for the first region of the display screen, wherein upscaling the first portion of the image data comprises duplicating the first portion of the image data over adjacent pixels of the display screen in at least one direction, and not upscaling a second portion of the image data for the second region of the display screen.

14. The method of claim 13, wherein the upscaling comprising duplicating the first portion of the image data across one or more pixel columns of the display screen.

15. The method of claim 13, wherein the upscaling comprises duplicating the first portion of the image data across one or more pixel columns of the display screen.

16. The method of claim 13, wherein the display device comprises a first data driver for a first subset of pixel rows of the display screen, and a second data driver for a second subset of pixels rows of the display screen, and upscaling the image data comprises:
  providing a row of image data to both the first data driver and the second data driver.

17. The method of claim 16, wherein providing a row of image data to both the first data driver and the second data driver comprises storing a row of image data in a row buffer, and routing the row of image data from the buffer to both the first data driver and the second data driver.

18. The method of claim 13, wherein the resolution configuration data is stored in a virtual reality headset, and the image data is received at the virtual reality headset from a virtual reality console.

19. The method of claim 13, wherein the image data is received from the virtual reality console via a wired connection between the virtual reality console and the virtual reality headset.

20. The method of claim 19, further comprising:
  receiving the resolution configuration data from the virtual reality console via the interface.

21. The method of claim 13,
  wherein the first region of the display screen has a first native resolution and operates in reduced resolution by having an effective resolution lower than the first native resolution, and
  wherein the second region of the display screen has a second native resolution and operates in full resolution by having an effective resolution that is same as the second native resolution.

22. The method of claim 21, wherein the first native resolution has the same pixel density as the second native resolution.

* * * * *